(12) United States Patent
Perillat et al.

(10) Patent No.: US 6,434,983 B1
(45) Date of Patent: Aug. 20, 2002

(54) STARTING AND LOCKING/UNLOCKING DEVICE FOR MOTOR VEHICLE

(75) Inventors: Bertrand Perillat; Didier Solirenne, both of Toulouse (FR)

(73) Assignee: Siemens VDO Automotive S.A.S., Toulouse (FR)

( * ) Notice: Subject to any disclaimer, the term of this patent is extended or adjusted under 35 U.S.C. 154(b) by 0 days.

(21) Appl. No.: 09/787,487

(22) PCT Filed: Sep. 10, 1999

(86) PCT No.: PCT/EP99/06717

§ 371 (c)(1),
(2), (4) Date: Mar. 15, 2001

(87) PCT Pub. No.: WO00/15476

PCT Pub. Date: Mar. 23, 2000

(30) Foreign Application Priority Data

Sep. 15, 1998 (FR) .............................. 98 11472

(51) Int. Cl.⁷ .............................................. B60R 25/02
(52) U.S. Cl. ............................ 70/252; 70/257; 70/389; 70/408; 70/429; 70/456 R; 70/459; 180/287; 340/5.62
(58) Field of Search .......................... 70/257, 408, 252, 70/456 R, 459, 389, 429, 430; 340/5.62, 5.67; 180/287

(56) References Cited

U.S. PATENT DOCUMENTS

| 2,491,337 A | * | 12/1949 | Segal .......................... 70/429 |
| 3,380,549 A | * | 4/1968 | Hille .......................... 180/114 |
| 3,851,505 A | * | 12/1974 | Wilkinson .................. 70/389 X |
| 4,898,010 A | * | 2/1990 | Futami et al. ............. 70/389 X |
| 4,938,043 A | * | 7/1990 | Burr ............................ 70/252 |
| 5,521,443 A | | 5/1996 | Imura et al. ............... 307/10.2 |

FOREIGN PATENT DOCUMENTS

| EP | 0314143 A2 | 5/1989 |
| FR | 2759109 | 8/1998 |

* cited by examiner

Primary Examiner—Lloyd A. Gall
(74) Attorney, Agent, or Firm—Laurence A. Greenberg; Werner H. Stemer; Ralph E. Locher

(57) ABSTRACT

The present invention relates to a device (10) for starting and for locking/unlocking a motor vehicle, of the type comprising:

a key (11) carrying at least one control for locking/unlocking the vehicle, a support (12) designed to accommodate the key in an appropriate housing (13) and to detect the presence of this key in the housing, and an element for starting/stopping the vehicle engine, the device being characterized in that the starting/stopping element is a bistable button (15) formed on the support (12), the said button (15) furthermore constituting a structure for immobilizing the key (11) in the housing (13) when the vehicle is in operation.

3 Claims, 1 Drawing Sheet

STARTING AND LOCKING/UNLOCKING DEVICE FOR MOTOR VEHICLE

BACKGROUND OF THE INVENTION

Field of the Invention

The present invention relates to a device for starting and locking/unlocking a motor vehicle. More specifically, this device is also known as an electronic key.

The issuing of commands to start and/or to stop a motor vehicle in an electronic manner is already known. What happens here is that the presence of an "electronic key" in an appropriate support is detected so as to allow the vehicle to be started or stopped.

Now, as this key is simply placed (without attachment) in an appropriate support, it has seemed preferable, for elementary safety reasons, for this key not to be able to removed from its support (inadvertently, as the result of an accident, etc.) while the vehicle is operating. Indeed, removal of the key from its support could cause the vehicle to stop.

SUMMARY OF THE INVENTION

The object of the present invention is to create a device for starting and locking/unlocking the vehicle comprising an "electronic key" that cannot be removed from its support while the vehicle is operating.

To this end, the present invention relates to a device for starting and for locking/unlocking a motor vehicle, of the type comprising:

- a key carrying at least one control for locking/unlocking the vehicle,
- a support designed to accommodate the key in an appropriate housing and to detect the presence of this key in the housing, and
- a means for starting/stopping the vehicle engine, said device being characterized in that the starting/stopping means is a bistable button formed on the support, said button furthermore constituting a means for immobilizing the key in the housing when the vehicle is in operation.

Advantageously, the command to start the engine causes the button to deploy and the key to be held in position in the support. The command to stop the vehicle itself causes the button to be effaced and the key to be released.

Other objects, features and advantages of the present invention will in any case become more apparent from the description which follows, by way of non-limiting example, with reference to the appended drawings in which:

DESCRIPTION OF THE PREFERRED EMBODIMENT

Figure 1:
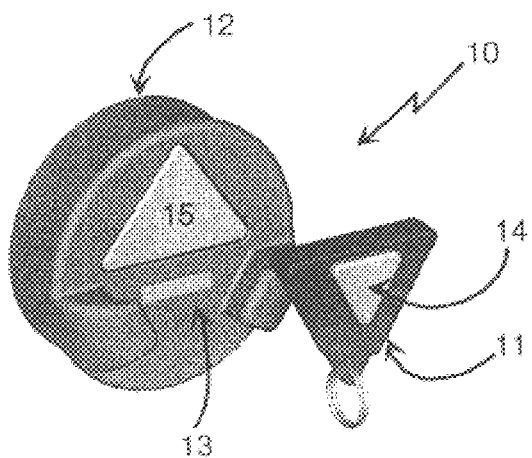
FIG. 1 is a schematic perspective view of the device according to the present invention, showing a key 11 before it is placed in a support 12.
Figure 2:
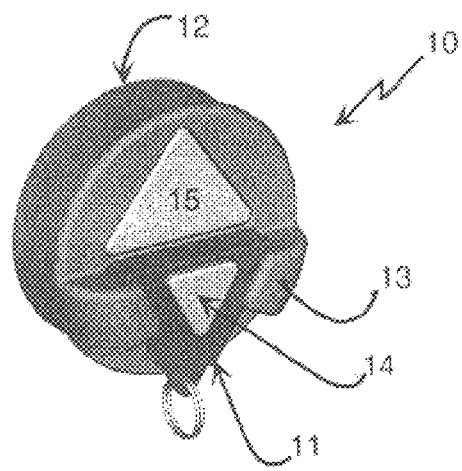
FIG. 2 is a view similar to FIG. 1, showing the placing of the key in its support.
Figure 3:
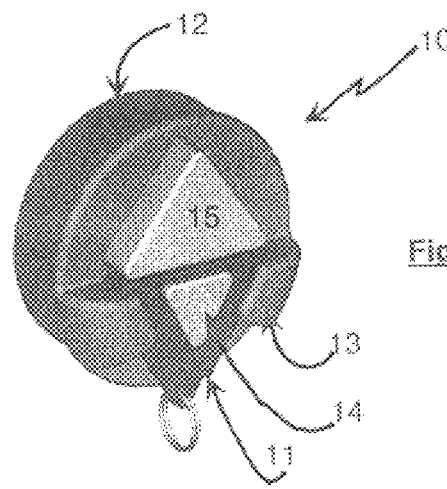
FIG. 3 is a view similar to FIG. 1, showing a key placed in its support when a command to start has been issued.

According to the embodiment depicted in FIGS. 1 to 3, the starting and locking/unlocking device 10 according to the invention comprises:

- a key 11,
- a support 12 equipped with an appropriate housing 13 designed to accommodate this key, and
- a means 15 for immobilizing the key and for starting/stopping the vehicle engine, this means consisting of a bistable button 15.

The bistable button 15 may adopt a deployed position when it has been pressed for a first time and a retracted position when it has been pressed for a second time. In its deployed position (FIG. 3), this button protrudes from the surface of the support 12. In its retracted position (FIGS. 1 and 2), this button lies flush with the surface of the support 12. The function of this button will be explained in detail later on.

The key 11 comprises a command 14 for locking/unlocking the vehicle remotely. Pressing on this command makes it possible, via a transponder (known per se) to cause the vehicle to unlock and/or to lock. This command may also operate any alarm device that might be installed in the vehicle.

As an alternative (not depicted), this key 11 has no remote locking/unlocking device and is equipped with a simple key bit fulfilling the locking and unlocking functions.

The support 12 is installed on the dashboard of the vehicle (for example) and is equipped with a detection means (for example a coil (not depicted)) designed to detect the presence of the key 11 in the housing 13. FIG. 1 depicts the device according to the invention before the key is placed in the housing 13.

Referring now to FIG. 2, the key 11 is now in place in its housing 13.

According to the invention, the support is equipped with a means 15 of immobilizing the key in its housing. This immobilizing means consists of the bistable button 15. In FIGS. 1 and 2, in the absence of a command to start the vehicle engine, the button 15 is in the retracted position and lies flush with the surface of the support 12 without impeding the introduction of the key 11.

In FIG. 3, the command to start the vehicle engine has been issued by the driver by pressing on the bistable button 15 for a first time. This pressing causes the button to deploy above the surface of the support 12 and immobilizes the key 11 in its housing 13. What happens is that when the button 15 is in the deployed position, it impedes any removal of the key. This removal can be effected only if the bistable button 15 is pressed a second time so as to cause it to efface into the support 12.

The first pressing of the button 15 therefore causes this button to deploy and, at the same time, causes an engine management unit (known per se and not depicted) to check that the key 11 is present in the support 12. If the key is actually detected as being present in the housing 13, authority to start the engine is granted. The vehicle engine starts.

If, on the other hand, the presence of the key 11 in the housing 13 is not detected, the authorization to start the vehicle engine is not granted. This prevents accidental pressing of the bistable button 15 (for example by a child) from starting the vehicle engine in the absence of the key.

It will be noted that the bistable button 15 is arranged in such a way that it has at least one face designed to collaborate with a corresponding face of the key 11 so as to immobilize it in its housing 13. More precisely, the collaboration between the face of the bistable button in contact with the key and the face of the key closes up the empty space surrounding the key when the latter is placed in its housing. The closing-up of this empty space surrounding the key immobilizes this key in its housing 13.

When the command to stop the vehicle is issued by pressing the button 15 again, this button effaces itself into the support 12 to adopt the retracted position depicted in FIG. 2. Removal of the key is then authorized.

It will be noted that the device according to the present invention is designed to inform the central engine management unit of the following conditions:

a) the key 11 is present in the housing 13 and there has been a request to start, b) the key 11 is present in the housing 13 and there has been no request to start, c) the key 11 is absent from the housing 13 and there has been a request to start, and d) the key 11 is absent from the housing 13 and there has been no request to start.

Each one of these situations can be dealt with differently by the central processing unit. Thus, for example, situation a) gives rise to authorization to start, situation b) causes the switching-on of the accessories (car radio, window lifter, etc), situation c) causes activation of an alarm signal and situation d) leads to authorization to lock the doors (for example).

Of course, the present invention is not restricted to the embodiment described hereinabove and depicted. Thus, in addition to the presence of the key in its housing 13, additional parameters regarding the operation of the vehicle can be used to authorize the deployment or effacing of the button 15 (for example, the non-selection of a gear, application of the parking brake, etc).

What is claimed is:

1. A device for starting and for operating a lock of a motor vehicle, comprising:

a key carrying at least one control device for operating a lock of a motor vehicle;

a support accommodating said key in a suitable housing and configured to detect a presence of said key in said housing;

a bistable button formed on said support for starting/stopping an engine of the motor vehicle, said button being further configured for immobilizing said key in said housing when the vehicle is in operation.

2. The device according to claim 1, wherein said button is configured such that a first pressing thereof starts up the engine of the motor vehicle and deploys said button so as to immobilize said key in position in said housing when said key is present in said housing, and a second pressing thereof stops the engine and retracts said button so as to release said key.

3. The device according to claim 1, wherein said button is shaped to cooperate with a shape of said key so as to fill an empty space surrounding said key when said key is in said housing and said button is depressed.

* * * * *